Jan. 17, 1967 C. A. ISBERG 3,299,406
MULTIPLE ACCESS DELAY STRUCTURES
Filed Dec. 31, 1962 8 Sheets-Sheet 1

INVENTOR.
CLIFFORD A. ISBERG
BY
Fraser and Bogucki
ATTORNEYS

Jan. 17, 1967 C. A. ISBERG 3,299,406

MULTIPLE ACCESS DELAY STRUCTURES

Filed Dec. 31, 1962 8 Sheets-Sheet

INVENTOR.
CLIFFORD A. ISBERG
BY Fraser and Bogucki
ATTORNEYS

INVENTOR.
CLIFFORD A. ISBERG
BY Fraser and Bogucki
ATTORNEYS

INVENTOR.
CLIFFORD A. ISBERG
BY Fraser and Bogucki
ATTORNEYS

INVENTOR.
CLIFFORD A. ISBERG

BY Fraser and Bogucki

ATTORNEYS

INVENTOR.
CLIFFORD A. ISBERG
BY
Fraser and Bogucki
ATTORNEYS

INVENTOR.
CLIFFORD A. ISBERG
BY Fraser and Bogucki
ATTORNEYS

INVENTOR.
CLIFFORD A. ISBERG
BY
Fraser and Bogucki
ATTORNEYS

United States Patent Office 3,299,406

Patented Jan. 17, 1967

3,299,406

MULTIPLE ACCESS DELAY STRUCTURES

Clifford A. Isberg, San Jose, Calif., assignor to International Business Machines Corporation, New York, N.Y., a corporation of New York Filed Dec. 31, 1962, Ser. No. 248,785

19 Claims. (Cl. 340—172.5)

This invention relates to data processing systems, and in particular to message routing systems which manipulate message data in the time domain to transfer the data in record form between an input system and an output system.

The field of data processing concerns, among other things, the conversion of uninterpreted or unorganized data into some form of electrical or mechanical signal and the subsequent transmission and utilization of the signals at higher speeds than would otherwise be possible. The techniques of automatic electronic data processing are being increasingly applied where large amounts of data must be stored, processed or presented, as in keeping commercial records, undertaking scientific testing and performing complex calculations.

Modern data processing systems employ a variety of components and combinations for performing the different information handling functions demanded of the system. In one such function, data received from an outside source is transferred from one component to another within a single system while each component operates upon the data in the manner desired. Different data processing systems may even be arranged and interconnected to transfer data between themselves in performing certain operations.

In any data processing system or combination of interconnected systems, is is desirable to accomplish the necessary intersystem and intrasystem transfers of data in a most efficient and accurate manner. However, the components and combinations seldom have the fully compatible characteristics which are needed to allow the data to be transferred by simple interconnection. In particular, incompatibilities of time domain characteristics cause serious problems resulting in unnecessary loss of time and inefficient use of the expensive communications connections. To illustrate, many processing operations can be carried out at high speed by electronic circuitry, whereas other operations involving read-in and read-out of the data to and from the systems respectively are usually effected by mechanical devices having inherently slower speeds of operation.

In the prior art, various schemes have been employed to solve the time domain problems of data transfer. The usual techniques are to introduce special buffers or intermediate storage devices between the different units, or else to multiply the number of input and output devices to handle increased information flow rates. Such techniques utilize elementary time domain systems to merely compress or expand data on the time scale, or merely bypass time domain problems simply by adding more equipment. However, this cannot provide adequate solutions of all time domain system problems. Even though two functional units may be made to have identical data rates between their respective inputs and outputs, delays in the transfer of information may be necessary because of incompatibilities between data supply by one unit and and the time at which the data is demanded by the other unit. In other words, the supply of information to a particular unit may be out-of-phase with the demand for more information from that unit.

A common illustration of this problem may be found in a central telegraph station which has incoming lines from many different sending stations. The central receiving station is often engaged in receiving messages from one or more sending stations at the same time that an additional one of the sending stations is ready to transmit a message. Thus there is a surplus of messages when there is no additional demand from the receiving station.

One method of alleviating the difficulties of data transmission is to divide the data into separate signal increments, each increment comprising a distinct record. The records may be made of equal length and can be transmitted during distinct record cycle intervals. This grouping of the information permits the data processing systems to treat large amounts of information as a single unit for purposes of transmitting and receiving. The lengths of the records may be chosen to correspond to the most convenient groupings for the type of data and the method of transmission.

Various advantages, such as the opportunity to use conventional multiplexing techniques, are available when data messages are arranged in discrete record increments which can be transmitted during discrete record intervals. However, certain basic problems still arise in the transmission of such data records due to the previously mentioned incompatibility between supply and demand for the components or systems. Each of these problems is related to the fact that just as with full messages, the record intervals during which records are supplied from one component may in many cases have a random relation to the record intervals in which demand is made for these records by another component. Prior solutions for such problems have included techniques for storing each record in a different buffer storage device when supplied and later simply reading out the record in its proper order when demanded. However, providing these separate storage buffer devices for each record greatly multiplies the equipment needed for transmission and the overall cost and complexity of the systems.

The three basic operations of stacking, feeding and queuing are inherent in record data transmission situations where this supply and demand problem exists. The stacking problem may be characterized by the necessity for storing records received during random record cycles from a supply source in the order of their receipt in a circulating memory. The feeding problem, on the other hand, involves procuring records from their original order in a circulating memory and supplying them upon random demand to a receiving station. A combination of the first two operations is inherent in the queuing problem, in which records supplied at random times from a supply source are to be transmitted to a receiving station making random demands for these records.

One solution for the above problems is disclosed in the co-pending application Serial No. 243,063, of John A. McLaughlin for a "Message Routing System" filed December 7, 1962. Passive delay devices and a relatively small amount of logical circuitry are used to produce low cost and relatively simple time domain systems having broad application to data processing and transfer syssystems. However, further reductions in complexity, cost and equipment of such systems are still to be desired.

Therefore, an object of the present invention is to provide improved data processing systems for manipulating data messages in the time domain.

Another object of this invention is to provide a data processing system employing a small number of passive elements which may be connected between a sending station and a receiving station to achieve an order flow of data signals therebetween.

A further object of this invention is to provide simplified time manipulation circuitry for obtaining an orderly flow of data records when the message input and outputs to the circuitry are randomly related in time.

Still another object of this invention is to provide improved stacking circuits for accomplishing the orderly arrangement of incoming data signals, which occur at random time intervals, for subsequent insertion in a circulating memory or like device.

A still further object of this invention is to provide improved feeding circuits for producing orderly flow of information records between a circulating storage device and an output device making random demands for these signals.

An additional object of this invention is to provide an improved logic controlled variable delay device which will operate as a first-in, first-out storage for data records between a sending and demanding circuit, where the sending circuit provides signals to the delay device at random time intervals and the demand device demands these signals from the delay device also at random time intervals.

Other objects of this invention are to provide stacking, feeding, and first-in, first-out circuits employing a minimum number of passive delay devices and logical circuitry as storage elements.

Briefly, in accordance with the objects of the invention, unique variable time delay circuits are combined with decision circuitry in such manner as to provide variable time delays and storage paths necessary for an orderly flow of information between two points. The variable time delays are essentially composed of a series of unequal but related separate passive delays connected in serial fashion between a sending station and a demanding station. Each of these variable time delays contains multiple access or multiple removal devices so related as to provide a number of delay paths through which a data record may be passed. The gating circuits are connected with the access and removal devices of each variable time delay so that a particular data record can be selectably routed to and from each passive delay in the series. The delay devices may be used in series, or in some cases as recirculating elements where the demand for the records is random in nature.

Control over the gating elements is exercised by a separate control circuit capable of comparing the time of sending of a particular record with a measured possibility of a demand for that record from the demanding circuit. The control circuits include a counter means with separate stages uniquely related to the construction and capacity of each delay means. The counter means is capable of registering a total count in a number of separate digits, each digit having a radix and a modulo count indicative of the total delay provided by a respective delay device. The counter means can thus maintain a total count while utilizing the count so registered in the control of the gating elements.

The invention will be better understood on consideration of the following detailed description taken together with the accompanying drawings, in which like elements in the various figures have like reference characters and in which.

In general, the specification and the associated drawings are so arranged as to include a simplified description of the forms of the invention which will aid in the understanding of the specific circuitry involved. For this purpose, a simplified stage diagram is included along with a signal flow table or time diagram to illustrate the nature of the problems presented to systems in accordance with the invention and how these problems are overcome. Specific arrangements for one or more exemplifications of each type of system are included thereafter using block diagrams to explain the practical implementation of each of the concepts. The more detailed diagrams are concerned only with relatively small systems, for simplicity, but the interrelationships of the various units are defined and illustrated as the description proceeds to allow application to larger systems.

Figure 1:
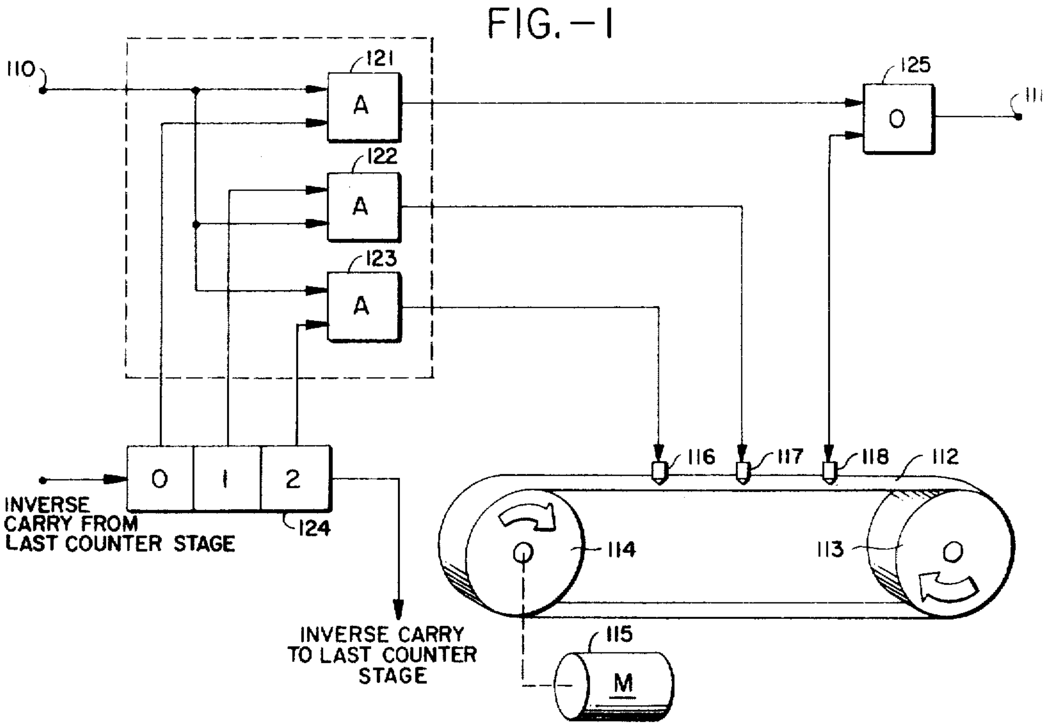
FIG. 1 is a block diagram illustrative of the basic concept of a single stage of a stacking system according to the invention.

In FIG. 1, an exemplification of a single stage of a "stacking" system is shown for accepting records in electrical signal form at an input terminal 110 and delivering them to an output terminal 111 after a selected period of time. The main purpose of a complete stacking system is to receive electrical signals in the form of discrete records from a source which supplies these signals during random record cycles and to rearrange these records in the time domain by means of a number of these stages so that they may be stored upon a recirculating memory in the order of their reception. The term "stacking" is derived from an analogy to the conventional punch card handling systems in common usage in the data processing field. Considering each card as being a record or message, cards may be received at random intervals and stacked in the order of their receipt, simply by placing the most recently received card on the top of the previously received cards.

In contrast, the data records contemplated for use with systems of the present invention are in the form of electrical pulses received in the time domain and cannot be physically accumulated in a manner comparable to the card system. To illustrate, suppose that records are arriving intermittently from a source and that it is intended to store them in a circulating memory loop in the same order in which they arrive. If all records must enter the loop through a single "write" station located adjacent the continually circulating loop, a time domain problem is immediately encountered in that the circulating loop may not be in the proper position with relation to the "write" station to accept a given record as the record arrives from the source. Many records may arrive during one complete circulation of the recirculating storage memory in any high performance system. Therefore, a stacking system between the record source and the circulating memory is arranged to provide a temporary orderly storage of each incoming record until it can be properly positioned on the circulating memory with a minimum time loss. Due to the possible high volume of the records from the source, the stacking system should be capable of storing at least one less record than the capacity of the storage loop.

For simplicity of description, a fixed record length is assumed. When it is considered that there are no inherent lower and upper limits on the record length, it may be seen that such systems may easily be used to handle actual messages of arbitrary length by subdividing the messages into selected incremental parts each being a record cycle long. The information contained in the records will be considered as purely digital in form even though similar systems may be constructed for analog signals. Most present day data processing systems are for handling digital information and employ digital logic circuits. Although analog circuits are widely used, representation of the concepts of the invention as applied to the digital techniques will be more directly and generally useful.

Returning now to FIG. 1, a complete stacking system includes a number of stages like that shown connected in series in ascending order of total delay to provide a total delay interval equal to a predetermined number of record cycles between the receipt of the record from the source and its arrival at the circulating memory. This total delay interval is determined by the position of the circulating memory loop at the time of arrival of a particular record from the source.

As will be shown in FIG. 1, each stage of a stacking system is capable of passing a selected record from the input terminal 110 to the output terminal 111 of the stage either without delay or with one of a plurality of delay intervals equal to an integral number of record cycles. The delay device may be provided by an endless magnetic tape loop 112 held by a pair of rollers 113 and 114. The roller 114 is connected to a constant speed motor 115 so that the tape is driven at a constant speed past three magnetic record-reproduce heads 116, 117 and 118 positioned adjacent the magnetic recording surface. It will be appreciated that other practical tape systems employ capstan drives, tape guides and other means for improved operation. The magnetic heads 116 and 117 are capable of writing digital information upon a single track on the tape 112 in conventional magnetic recording fashion. The third magnetic head 118, on the other hand, is capable of reading from the tape 112 the digital information recorded on the track by the heads 116 and 117 and can also function to erase the recorded information when a separate erase head is not provided. The "write" head 117 is spaced a distance from the "read" head 118 so that the total amount of time required for a point on the tape to traverse the distance between the two heads is equal to an integral number of record cycles. The "write" head 116 is placed at the same integral number of record cycles from "write" head 117 along the track. Thus, when a record is written with "write" head 117 it is delayed for a first intreval of time until reaching the "read" head 118; a record recorded on the track by the "write" head 116 on the other hand, is delayed for a period twice as long as the first interval before being read out by the "read" head 118.

Three AND gates 121, 122 and 123 are arranged as a one-of-three selector which is controlled by a three count reverse counter 124. Each of the AND gates 121, 122 and 123 are connected to receive records from the input terminal 110. The records are then routed through one of the AND gates 121, 122 or 123 depending upon the state of the counter 124. A "zero" count indicates that no delay of the record is required by that stage and the record is delivered through the enabled AND gate 121 directly to an OR gate 125 at the output of the stage without delay. A gate signal is delivered to the AND gate 122 when the counter is in its "one" state so that a record is passed through the AND gate 122 to the "write" head 117 to be delayed for the smaller of the two delay intervals provided by the magnetic tape arrangement. Finally, a "two" count causes the record from the input terminal 110 to be delivered to the "write" head 116 to receive a double delay.

The record recorded on the track of the tape 112 are later read by the "read" head 118 and delivered through the output OR gate 125 to the output terminal 111. Thus, depending upon the count contained in the container 124, a record arriving at the input terminal 110 of the stage can be either delivered without delay to the output terminal 111 or delayed for an integral number of record cycles equal to either a first time interval or a second time interval double the first.

Figure 2:
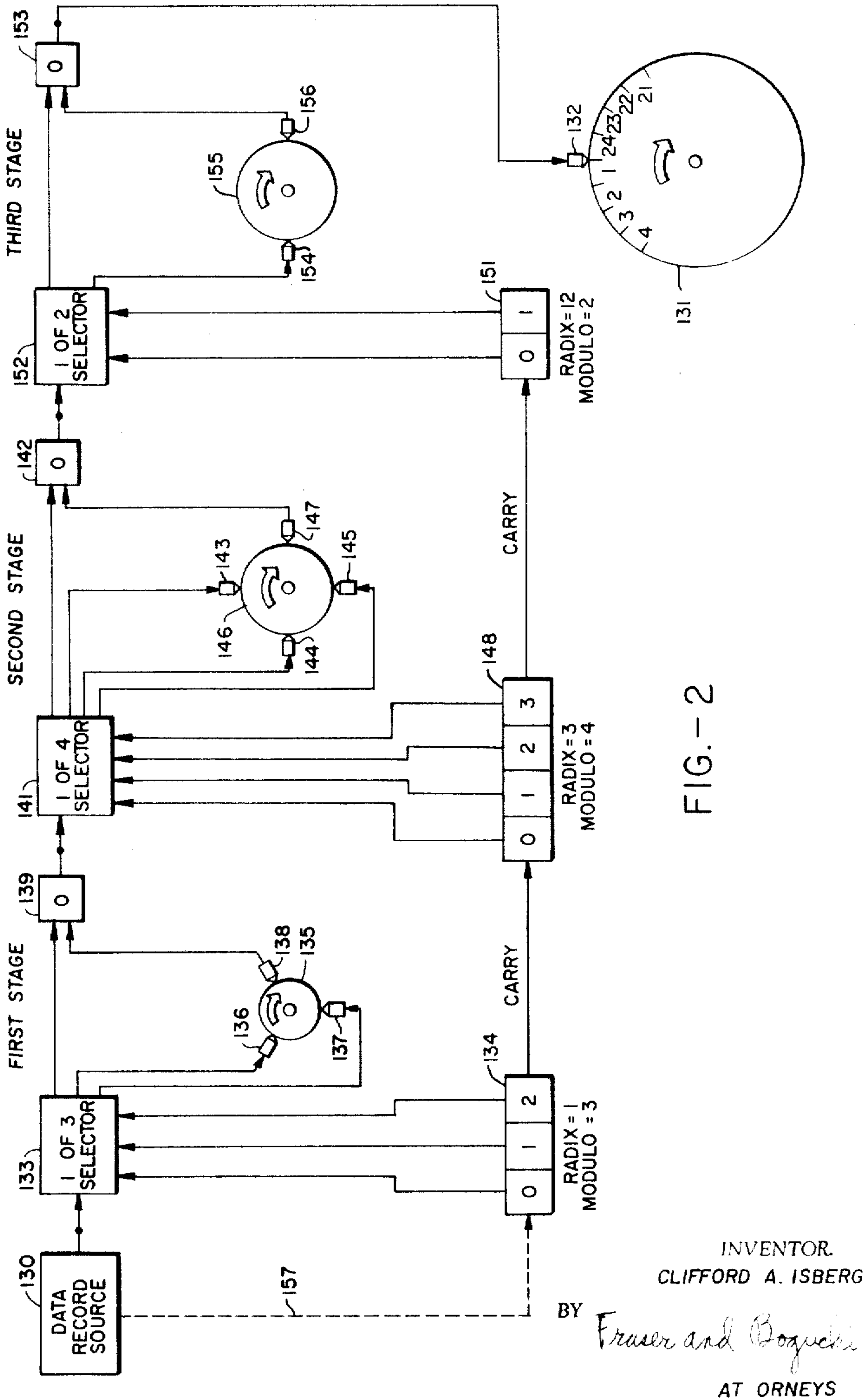
FIG. 2 is a schematic block diagram of the essential elements of a stacking system according to the invention.

Referring now to FIG. 2, a preferred embodiment of a complete stacking system is shown consisting of three stages. The records are received from a data record source 130, passed through the three stages of the stacking system, and recorded in the order of their receipt on a continuously circulating memory 131. The first stage is capable of producing delays of either one or two record intervals in length. The second stage gives delay intervals of three, six or nine record cycles in length, and the third stage is capable of delaying a record a total of twelve record cycles. The records from the output of the third stage proceed to a circulating magnetic memory consisting of the magnetic drum having twenty-four separate record positions on a repeating magnetic track. A recording head 132 positioned adjacent the magnetic track on the drum 131 provides the single access point for the constant speed recirculating storage device. Movement of the drum 131 relative to the stationary head 132 is assumed to be synchronized with the data record source 130 so that the beginning of a record from the source coincides with the positioning of the recording head 132 at the beginning of a record position on the drum 131.

A record arriving at the first stage of the stacking system is routed through a one-of-three selector 133, which is controlled by an associated reverse counter stage 134. The delay device, in this case, is a constant speed circulating magnetic drum 135 having three record/reproduce heads 136, 137 and 138 spaced at equal intervals around the drum surface on a single recording track. The delay interval between each pair of heads equals a single record cycle. Equal spacing of the magnetic heads 136, 137 and 138 about a continuous track provides economy in the length of the recording track and other advantages which will become more apparent upon a consideration of the detailed exemplification of FIG. 3 and its operation, as illustrated by the time diagram of FIG. 4.

If the first stage 134 of the counter is in the "zero" condition, a record from the source 130 is delivered directly to an output OR gate 139. In the "one" or "two" conditions of the counter, a record is recorded upon the track of the drum 135 by the heads 136 or 137 respectively. The records are later picked up by the output magnetic head 138 for delivery through the output OR gate 139, the delay interval being either one or two record cycles.

The second stage has a one-of-four selector 141 for receiving the records from the first stage and delivering them either directly to the OR gate or to one of the "write" heads 143, 144 or 145 to be recorded on the track of a larger recirculating drum 146. The drum 146 revolves at a constant speed to get the desired three cycle delay intervals between equally spaced "write" heads 143, 144 and 145 and the "read" head 147. Records read out by head 147 pass through the output OR gate 142 to the input of the third stage. Selector 141 is controlled by a second stage 148 of a reverse counter which receives the carry signals from the previous stage 134; thus the count in this stage decreases by one for each third count delivered to the first counter stage 134 of the stacking system.

The final reverse counter stage 151 receives carry signals from the preceding counter stage 148 and thus switches between the "zero" and "one" counts for every twelve counts received by the first stage 134 of the counter. This counter stage 151 controls a one-of-two selector 152 at the input of the third stage of the stacking system which either passes the arriving record directly to an OR gate 153 or records it with a "write" head 154 on the track surface of a drum 155. The record is delayed by the track for an interval equal to twelve record cycles until reaching a "read" head 156. The "read" head 154 then passes the delayed records through the output OR gate 153. Outputs from the OR gate 153 are coupled to the "write" access head 132 on the circulating memory drum 131 so that the signals from the last stage may be recorded thereon.

The counter stages 134, 148, and 151 are interconnected by carry lines to register a total number usually called the delay count, defined as the total delay through which a record arriving at a particular time must be routed before storage in the correct position on the recirculating memory loop 131. For example, suppose that record number seventeen arrives at the time that the "write" head 132 is adjacent the position of the surface of the drum 131 reserved for record number two. Record number seventeen cannot be fed directly to the "write" head 132 since record number two already occupies this position of the recirculating memory loop from 131. To place record number seventeen in position number seventeen on the drum surface requires a total delay of fifteen record cycles before the access head 132 is adjacent the position reserved for record number seventeen. It is apparent that the problem is unchanged if we relabel record number seventeen as record number eighteen, and record position number two as record position number three, since the delay required is still fifteen record cycles. Consequently the stacking system need only know the total delay time for proper operation without the necessity for knowing the number of the arriving record or the presently accessible record position. To obtain the delay count, the count in each of the counter stages is initially set to "zero." If no word arrives during a record cycle, a count pulse is delivered along the dotted line 157 from the record source 130 to be subtracted from the count represented by the condition of the counter stages. The reverse counter arrangement has a modulo count N, where N is the total record capacity of the recirculating memory loop 131, and "modulo count" simply means that if the counter is "zero" and "one" is subtracted from the counter, the counter becomes $N-1$; and otherwise the subtraction is the normal subtraction of grade school arithmetic. If a word does arrive during a record cycle, no count pulse is delivered along the connection 157 thus leaving the count unchanged for the next record cycle.

The different stages of the reverse counter, each related to its particular stage of the stacking system, represent separate digits in the total delay count. Each of these digits has a radix equal to the smallest obtainable delay of that stacker stage and a modulo count equal to the number of record paths available from the appropriate selector. The radix of each succeeding stage is equal to one more than the maximum delay obtainable by use of all the preceding stages. By using modulos larger than two, much larger storage capacities can be obtained in a stacking system with only a slight increase in the number of circuit elements required. Using the previous example, the delay of fifteen record cycles is obtained by a delay of twelve record cycles in the third stage and a delay of three record cycles in the second stage. The total record count is represented by the three digits 0—1—1, that is, $(0\cdot1)+(1\cdot3)+(1\cdot12)$. Any number from zero to twenty-three can likewise be represented in the three counter stages of FIG. 2.

It should be understood that the delay count, at the time the word arrives, identifies the amount of delay or storage time for this word. If the delay count is correctly defined at the time the word enters the stacker, a projected delay path is forecast. Despite subsequent changes in the delay count, the word correctly traverses the projected path and arrives at the circulating memory drum 131 at the correct time.

The counter always maintains a count equal to the correct delay path for a record. This count can decrease at most by one unit per record cycle, therefore the delay path determined at the time of entry of the record into the stacking system is not changed by subsequent changes in the count. The count follows, but never catches, the record which is advancing towards the circulating memory at the rate of one record position per record interval. This principle is more clearly illustrated by consideration of the time diagrams illustrating the typical operation of such system. From this, it is obvious that there is never interference between two different records appearing at the same point in the system at the same time.

Figure 3:
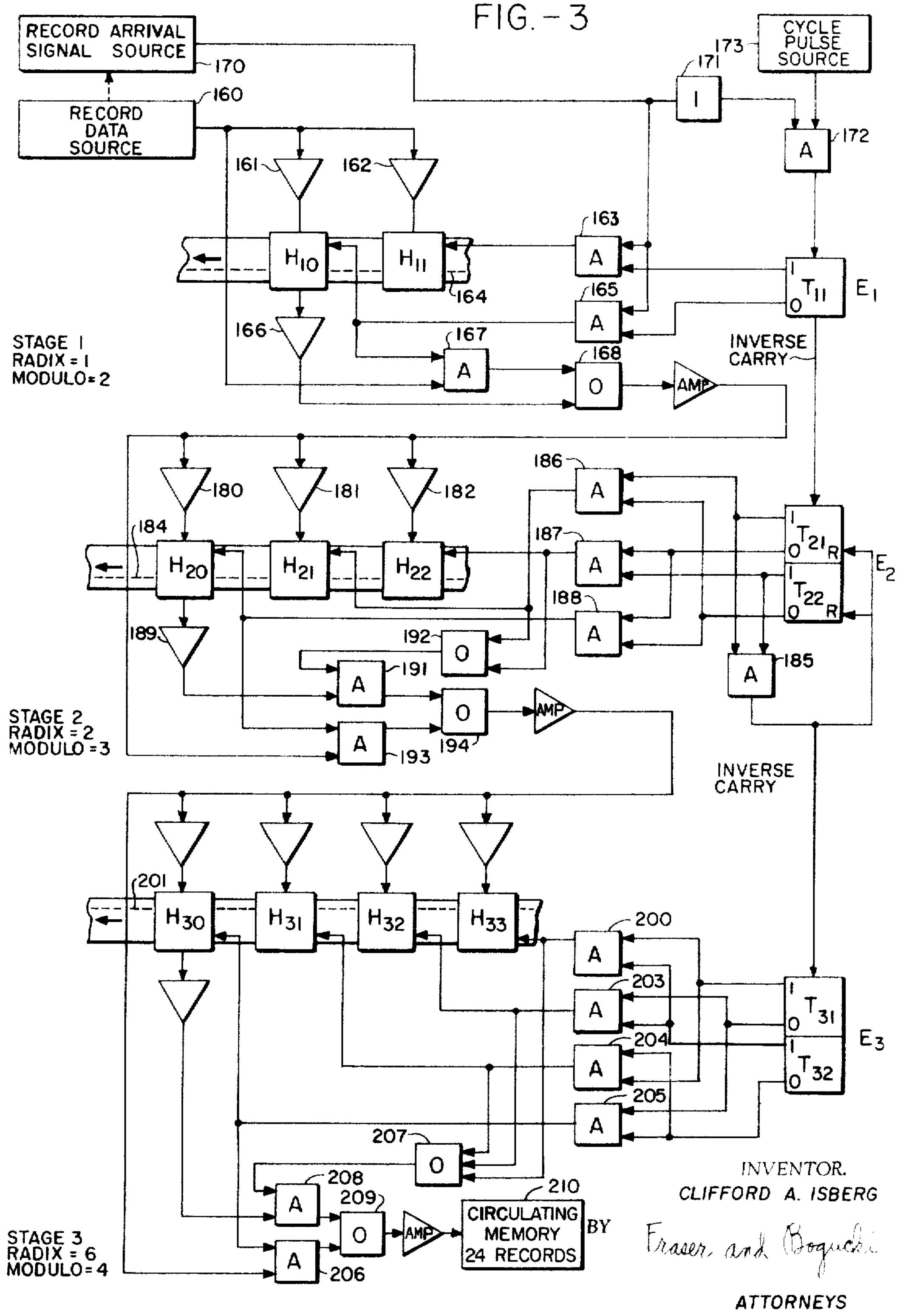
FIG. 3 is a block diagram in somewhat greater detail of one exemplification of a stacking system according to the invention.

Referring now to FIG. 3, the practical implementation of a stacking system according to the invention is shown in logical circuitry form. The logical circuitry is illustrated in conventional manner with A representing an AND circuit, 0 representing an OR circuit, and I representing a conventional inverter circuit which only produces an output when there is no input. The magnetic record/reproduce heads $H_n$ located adjacent the magnetic tapes for each stage are conventional in construction. These heads require an enabling signal to be applied thereto before the head can perform the recording function. Amplifiers, herein represented as triangular components, are located at the input and output of each magnetic head $H_n$ and also between succeeding stages to maintain the level of the data signals in the records at required levels.

The arriving records to the stacking system are obtained from the record data source 160 and delivered through both input amplifiers 161 and 162 to the respective magnetic heads $H_{10}$ and $H_{11}$. As the magnetic head $H_{11}$ receives an enabling signal from the AND gate 163, a record is recorded upon a recording track 164. The track 164 is formed on a recirculating recording medium, track or drum which has a two cycle recirculation interval. The recording head $H_{11}$ is positioned on the recording track 164 of the moving tape at a one record cycle interval from the pickup point of the magnetic head $H_{10}$. This magnetic head $H_{10}$ is retained in the "read" mode during all times except when a gate signal is received from a "zero" AND gate 165 to switch the head $H_{10}$ into the "write" mode at which time a data record from source 160 may be recorded on the track 164. When head $H_{10}$ is in the "read" mode, the records previously recorded on the track are reproduced and amplified by an amplifier 166 and delivered through an output OR gate 168.

On the other hand, when head $H_{10}$ is switched to the "write" mode data records from source 160 can additionally be recorded at that position on the track. The same gate signal from the "zero" AND gate 165 also enables AND gate 167 which passes the records directly from source 160 to the output OR gate 168.

A record arrival signal source 170 contains circuitry for sensing the initial portion of an arriving record from source 160 and delivering a constant output signal level for the period of one record cycle to maintain the AND gates 163 and 165 enables. This signal also operates through an inverter circuit 171 to disable an AND gate 172. Thus, count pulses from a cycle pulse source 173 can only pass through AND gate 172 to the first counter stage $T_{11}$ when no record is being received.

It should be noted that the stages of the counter are composed of binary counter stages arranged in a serially connected fashion to represent an appropriate digit $E_1$, $E_2$ and $E_3$ for each stage respectively. The overflow from each of the stages is connected to the succeeding stage so that the total delay count is maintained. Since the first stage requires only a modulo two digit $E_1$, the binary stage $T_{11}$ suffices to control AND gates 163 and 165.

A record emerging from the first stage output OR gate 168 is amplified by an interstage amplifier and delivered to the second stage. Three magnetic heads $H_{20}$, $H_{21}$ and $H_{22}$ in this stage are spaced along a continuous loop recording track 184, which is a total of six record cycles in length, at two record cycle intervals. The second stage digit $E_2$ requires two binary stages $T_{21}$ and $T_{22}$ arranged for modulo three operation so that, as the count reaches binary 1—1 (decimal 3), an AND gate 185 resets the two counter stages to the binary 0—0 condition and also delivers a carry pulse to the next stage $E_3$ of the counter.

AND gates 186, 187 and 188 are interconnected with the binary stages $T_{21}$ and $T_{22}$ to form a one-of-three selector for control of the three heads. Magnetic head $H_{20}$ is only switched to its "write" mode by an output from the "zero" AND gate 188. During other conditions of the one-of-three selector, head $H_{20}$ is in the "read" mode, and the records read hereby are delivered through an amplifier 189 to the input terminal of an AND gate 191. AND gate 191 is enabled by a signal delivered from either the "one" AND gate 186 or the "two" AND gate 187 through the OR gate 192 to pass the records read by head $H_{20}$ to an output OR gate 194. A signal from "zero" AND gate 188 also enables a bypass AND gate 193 which passes an incoming record directly to the output OR gate 194 of the second stage. Both the records bypassed and those delayed in the second stage are amplified by another interstage amplifier to be introduced to the third stage.

In the third stage, the record/reproduce head $H_{30}$ and the "write" head $H_{31}$ and $H_{32}$ and $H_{33}$ are arranged at six record cycle intervals from one another along the twenty-four cycle loop of track 201. Binary counter stages $T_{31}$ and $T_{32}$ register the digit $E_3$ for the third stage and are arranged in conventional fashion with AND gates 202, 203, 204 and 205 to form a one-of-four selector. "Zero" AND gate 205 enables bypass AND gate 206 and also places record/reproduce head $H_{30}$ in the "write" mode. The remaining AND gates 203, 204 and 205 of the one-of-four selector are connected to enable their respective "write" heads $H_{33}$, $H_{32}$ and $H_{31}$ and also deliver their outputs through an OR gate 207 to enable AND gate 208. AND gate 208 when enabled passes the records read by record/reproduce head $H_{30}$ through output OR gate 209 to be amplified and recorded upon a circulating memory 210 with a twenty-four record capacity.

Figure 4:
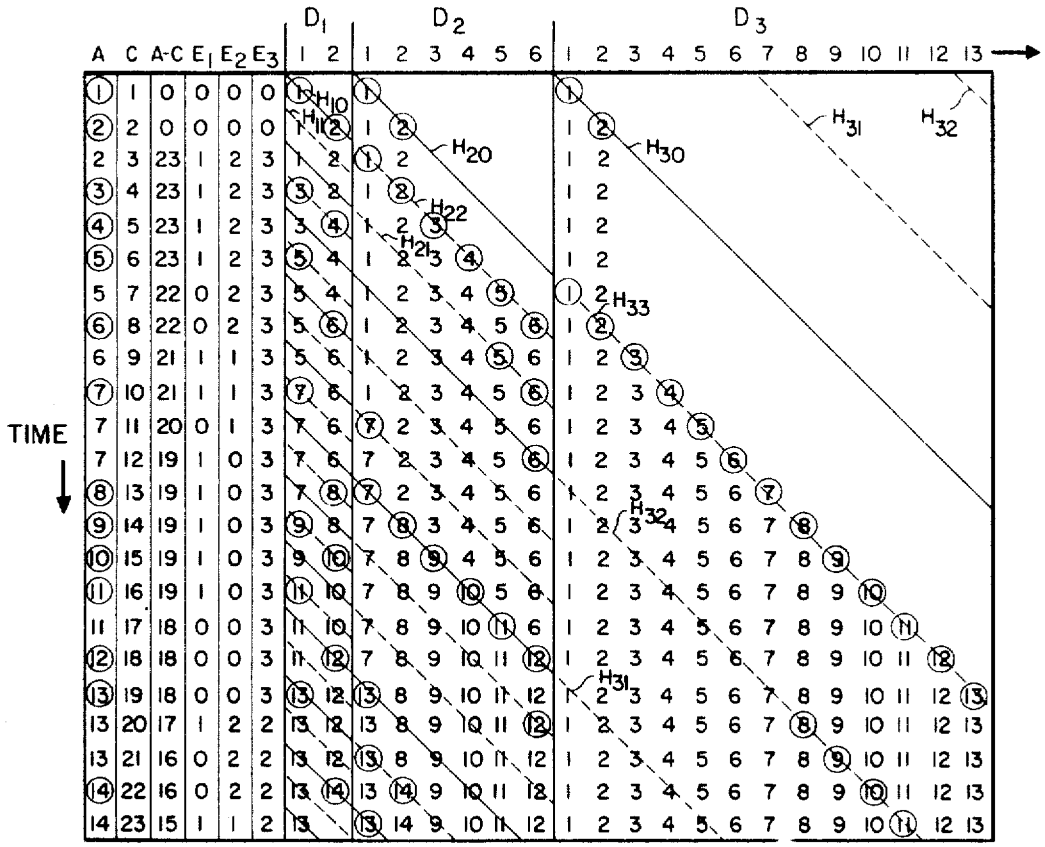
FIG. 4 is a time diagram of data transfer at successive signal intervals illustrating the operation of a stacking system, such as that shown in FIG. 3.

An overall understanding of the operation of this particular stacking system of FIG. 3 is readily obtained by reference to the time diagram of FIG. 4. In the time diagram of FIG. 4, successive record cycles in a typical operation of a stacking system according to FIG. 3 are represented with each horizontal line in descending order representing succeeding record cycles. The vertical columns relate to specific parts and conditions of the system during these record cycles. In particular, column A gives the number of the last record to arrive at the input to the stacking system with a circle around the number indicating the record cycle during which its arrives. Column C given the position of the single access station in relation to the circulating memory record positions, this being the cycle count. Columns E1, E2 and E3 illustrate the count registered by the reverse counter for each of the three digits. The delay columns $D_1$, $D_2$ and $D_3$ with the numbered columns thereunder represent the different digit positions on the tape and the records recorded thereon. Slanted lines cross these record positions to show the movement of the different heads relative to the tape; the solid lines represent the record/reproduce heads and the dashed lines, the recording or "write" heads. Recording of a record in a position is indicated by a circle around the record number. An additional column A—C is included to show the decimal equivalent of the three digit binary count registered by the counter stages $E_1$, $E_2$ and $E_3$.

In the time diagram, record No. 1 arrives during the first record cycle when zeros are registered by each of the three reverse counter stages. Record No. 1 is recorded on the track 164 of the first stage by the head $H_{10}$ which is in the "write" mode due to the "zero" state of the counter stage $E_1$. The record No. 1 also bypassed to the second and third stages and recorded on the respective tracks 184 and 201 by the heads $H_{20}$ and $H_{30}$. The arrival of the record prevents a cycle pulse from the source 173 from changing the count in the reverse counter stages during this record cycle. Therefore, during the next record cycle, record No. 2 arrives and is likewise recorded on all three tracks. Records No. 1 and No. 2 are also recorded on the circulating memory during the first two cycles.

During the third record cycle no record is received from the source 170 so the count changes to represent the decimal count twenty-three. Head $H_{10}$ is now in the "read" mode thus reading out record No. 1, which has now made a full circulation, and delivers record No. 1 to "write" head $H_{22}$ to be recorded again in the same position on the second stage track 184. "Write" head $H_{11}$ is now in the "write" mode, but no record is being received for it to record on the track 164. During the fourth record cycle, record No. 3 arrives and is immediately recorded by a head $H_{11}$ in the place formerly occupied by record No. 1 on the track 164. Record/reproduce head $H_{10}$ (now in the "read" mode) reads out record No. 2 and records it again in the second position on the second stage track 184 by means of the "write" head $H_{22}$ which is now enabled. It should be noted that a record remains in its position on the track until another record is recorded in that position.

The remainder of the timing diagram will not be explained herein for brevity. However, inspection of this diagram with relation to the general principles enunciated will give a clear understanding of the operation of the stacking system exemplification according to FIG. 3. It can be seen that the records become properly positioned on the track 201 to be read out to circulating memory 210 by the head $H_{30}$ on its next pass. Unfortunately space considerations prevent enlarging the time diagram illustration of $D_3$ to the full twenty-four cycle positions of the corresponding track 201.

A number of alternative arrangements of the passive delay means or tapes, recording and reproducing heads, and controlling electronics within the general operating principles previously described may be used to simplify the construction for specific types of delay means and recording or reproducing heads. For example, each stacker stage could be built from a number of parallel delay means or tapes, each using either a single recording and reproducing head, or a single recording head and a single reproducing head, with suitable modifications in electronic control circuitry as opposed to the previously exemplified serial arrangement of multiple recording and reproducing heads along a single tape or delay means. Alternatively, using the serial positioning at the recording and reproducing heads along a single delay means, the records entering a stage need be retained only as long as the delay counter for that stage specifies that the records be entered into that stage. Accordingly, a record need not be retained in the stage until the subsequent record which is to be recorded in the identical position as the former record arrives. This latter alternative allows the delay means required to implement the stage to be not a closed (mechanically or electronically) path as exemplified in the timing diagram, FIG. 4, but instead a simple or open loop delay as illustrated in the previously described FIG. 1.

It should be obvious from the preceding exemplifications that a stacking system using the multiple access concepts of this invention can be constructed having various modulo and radix arrangements. The maximum length of a recirculating recording track is reduced by using larger modulos in the first stages and smaller in the last; however, the number of recording heads for a given stacking capacity will be substantially increased over systems using large modulos in the final stages. Thus, the desire for shorter delay loops must be balanced against the requirement for greater number of magnetic heads.

Although the preceding description of the stacking system and the following descriptions of the feeding and queuing systems only mention the use of magnetic tape and drum arrangements to produce the desired delays, the invention is not so restricted. This has been used to illustrate the invention because of the simplicity of illustration involved, and the wide use of these systems for similar purposes. In many cases, however, comparable systems employing spiral track recording on discs or magnetostrictive delay lines, just to mention two of many, may prove equally useful, and in some cases superior to the tape and drum systems illustrated herein.

Figure 5:
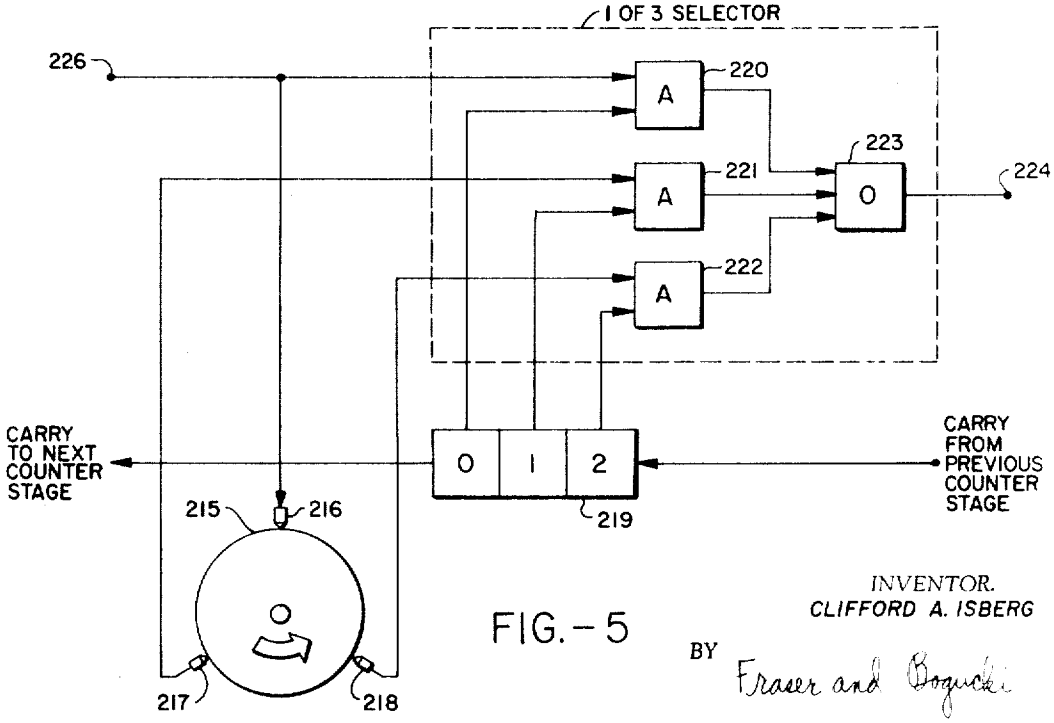
FIG. 5 is a block diagram of the general arrangement of a single stage of a feeder system according to the invention.

Turning now to the feeding problem, a multiple access feeding system may be provided for removing records from their positions on the circulating memory by means of a single access station and feeding them upon demand to a demanding station. Referring now to FIG. 5, a stage of a feeding system according to this invention is somewhat the reverse of the comparable stacking stage. A complete feeding system includes a number of these stages connected in series in descending order of total delay between the circulating memory and the demanding station.

Each stage of a feeding system may be considered as a recirculating memory in which the records are contained according to a measured possibility of a demand for the record at the output of the stage. The exemplary stage has a recirculating memory drum 215 or the like with a single record head 216 and a plurality (in this case two) reproduce heads 217 and 218 equally spaced about the recording track. A counter 219 is used to maintain the current value of a digit having a modulo equal to the number of heads on the recording track. In this case the modulo is equal to three and is connected in appropriate fashion to three AND gates 220, 221 and 222 in one-of-three selector fashion. Thus, the counter enables one of these AND gates 220, 221 or 222 to pass records through an output OR gate 223 to an output terminal 224.

A record arriving at an input terminal 226 of this exemplary stage is recorded on the track of the drum 215 by the record head 216 to be later read out by one of the reproduce heads 217 or 218 and passed through the respective AND gate 221 or 222. If the count registered for the digit counter 219 is "zero" than the record from the input terminal 226 is delivered directly through the "zero" AND gate 220 to the output without delay. As before, a "one" registered by the counter 219 allows a record reproduced by the head 217 to pass to an output terminal 224 through AND gate 221, whereas a "two" count lets records reproduced by head 218 pass through the enabled AND gate 222 to the output terminal 224. A record once recorded upon the recording track of the drum 215 remains in that position until a following record is recorded in that same position and continues to recirculate with the movement of the drum.

Figure 6:
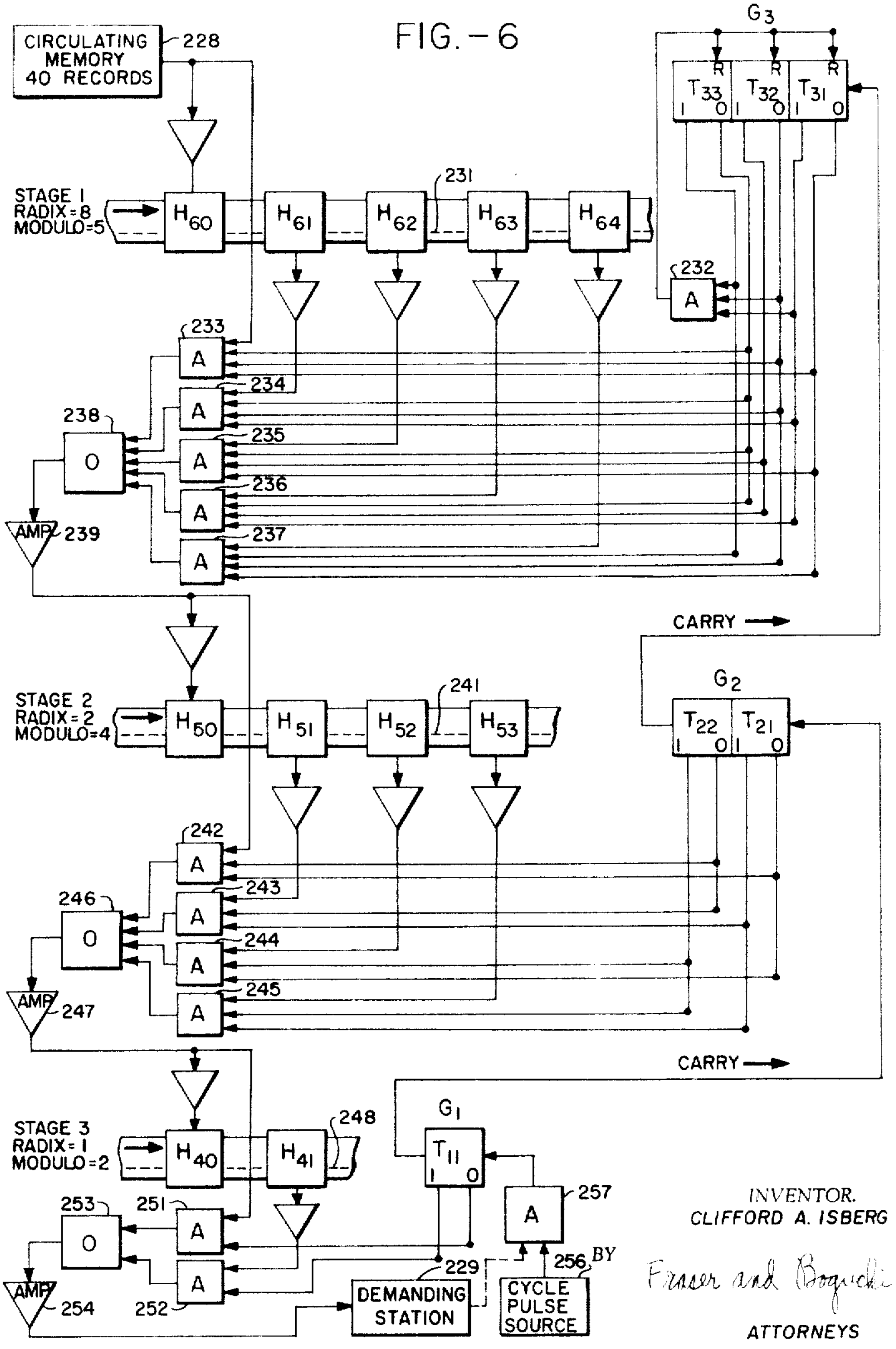
FIG. 6 illustrates in block diagram and idealized form one example of a stacking system acording to the invention.

Now referring to FIG. 6, in which a practical exemplification of a feeding system according to the invention is illustrated, three feeding stages are connected between a circulating memory 228 and a demanding station 229. The first statge has a recirculating magnetic recording loop having a track 231 which is a total of forty record cycles long. A single recording head $H_{60}$ and four reproducing heads are spaced equally at eight record cycle intervals from one another around the recording track 231.

The recording heads in the feeding systems of this invention remain in the "write" mode at all times, receiving the records from the single access station on the circulating memory 228 and recording them in order on the track 231. The reproduce heads $H_{61}$, $H_{62}$, $H_{63}$ and $H_{64}$ remain in the "read" mode at all times to reproduce records passing thereunder and pass these records through their respective amplifiers to the AND gates of the one-of-five selector. Thus the heads shown in this exemplification are not of the gated variety as used with the stacking system previously described, since all gating functions are carried out at the output of the stage.

The binary counter stages $T_{31}$, $T_{32}$ and $T_{33}$ form the digit $G_3$ counter which receives CARRY pulses from the second stage counter $G_2$ of the feeding system. The three stages are arranged for modulo five operation, that is, upon the count reaching the equivalent of decimal five, a pulse is delivered from an AND gate 232 to reset the binary stages to their zero count. Output signals from the binary stages selectively control five AND gates 233 to 237 to allow records to pass through an output OR gate 238 and an interstage amplifier 239 to the second stage. When the AND gate 233 is enabled by the "zero" count, records are passed directly from the circulating memory 228 to the output of the first stage while being simultaneously recorded on the magnetic track 231. As the count advances, a selected one of the remaining AND gates 234 to 237 is enabled to pass signals reproduced by the heads $H_{61}$ to $H_{64}$ to the output of the first stage. The second stage has the record head $H_{50}$ and the reproduce heads $H_{51}$, $H_{52}$ and $H_{53}$ spaced at equal two record cycle intervals around a recirculating magnetic track 241, which is eight cycles long. Records delivered from the output of the first stage go to the record head $H_{50}$ for recording upon the track 241. These records are also delivered to the input terminal of the bypass AND gate 242 which is enabled by the "zero" count of the second stage binary counter stages $T_{21}$ and $T_{22}$, pass the records reproduced by 244 and 245, when enabled by the appropriate count from counter stages $T_{21}$ and $T_{22}$, pass the records reproduced by the associated heads $H_{51}$, $H_{52}$ and $H_{53}$ respectively, to an output OR gate 246 for delivery to the third stage.

After amplification by the interstage amplifier 247, the records are recorded on a continuous track 248 which is a total of two record cycles long, of the third stage by a "write" head $H_{40}$ to be later reproduced by a "read" head $H_{41}$. Bypass AND gate 251 and AND gate 252 are controlled by the single binary stage representing the first digit $G_1$. The records are passed by the AND gate 251 or 252 that is enabled to the output OR gate 253. Records from the third stage then pass through an output amplifier 254 to the demanding station 229.

The binary stages in the feeding system are interconnected to form a forward binary counter representing the three digits $G_1$, $G_2$ and $G_3$. The counter maintains a current count of the control quantity $C-B$, which represents the difference between the cycle count C and the number of the last record demanded B. This count is obtained by connecting a cycle pulse source 256 to deliver single binary pulses through an AND gate 257 to the first stage $T_{11}$ of the binary counter. The demanding station 229 may contain circuitry for providing an enabling signal to the AND gate 257 only when no record has been demanded during the previous record cycle. Thus the count in the counter advances one count during each record cycle when no record has been demanded.

Figure 7:
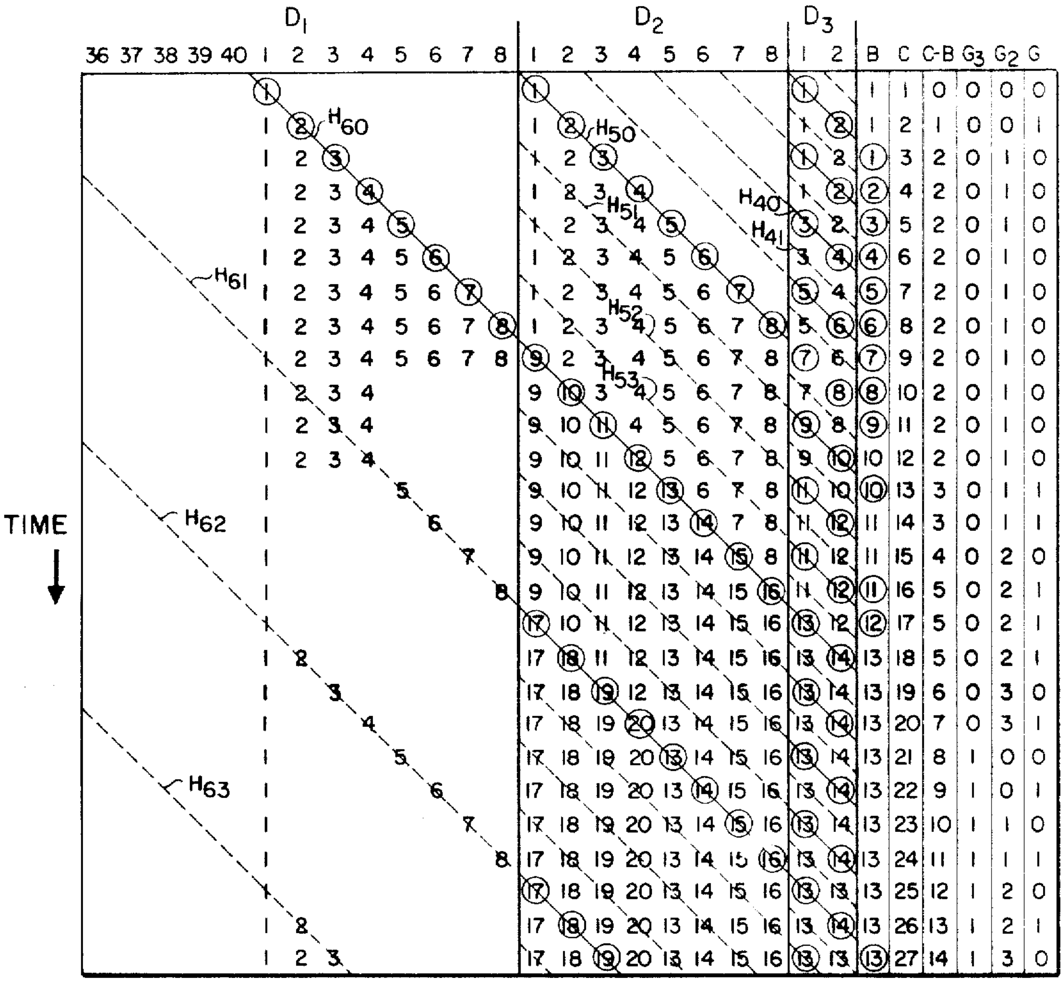
FIG. 7 is a time diagram of data transfers at successive signal intervals illustrating the operation of the feeder system shown in FIG. 6.

A more complete understanding of the operation of the feeding system of FIG. 6 can be gained by reference to the time diagram of FIG. 7. As in the previous time diagram, the horizontal rows represent in descending order successive record intervals in the operation of the system. The numbers placed in the rows are illustrative of the record numbers contained in each record position on the three circulating memories, herein designated $D_1$, $D_2$ and $D_3$, which constitute the three delay stages. Space considerations prevent the showing of all forty record positions for the first stage of the feeding system so only a few first and last positions are illustrated. Also, all the record positions have not been shown throughout the entire diagram to avoid needless repetition of the numbers.

The numbers in the right-hand column labeled B illustrate the number of the next record to be demanded from the system. A circle around that number in the column B shows the demand for that record from the demanding station. Column C represents the cycle count, and the column labeled $C-B$ shows the decimal equivalent of the count maintained in the three counter stages. Columns $G_1$, $G_2$ and $G_3$ give the count maintained by each of the digit stages of the counter. Diagonal lines show the passage of the heads across the record positions on each of the circulating loops, solid lines representing the respective "write" heads and dashed lines the respective "read" heads.

It is assumed for the purposes of this time diagram illustration that each of the recirculating delay loops is completely empty prior to the first record cycle illustrated. Subsequently the records from the circulating memory 228 are fed into each of the different recording tracks at the rate of one record per cycle until each track is filled to capacity. The overall principle of operation is to keep each of the tracks 231, 241 and 248 full to capacity at all times. During the first two cycles records numbers 1 and 2 are recorded by the "write" heads in the first and second record positions on each of the recording tracks. During the first eight record cycles the $D_2$ recording track 241 of the second stage and the $D_3$ track 231 of the third stage receive the first eight records in order, and so on. Record number 1 is then demanded at the third record cycle; the counter digit $D_2$ has been changed from "zero" to its "one" condition enabling the gate $H_{51}$ to read out record number 1. This record is then passed through the enabled AND gate 251 of the first stage to the demanding station 229. At the same time record number 1 is again recorded on the track 248 of the third stage in the same position by head $H_{40}$.

The count does not change for the next record cycle so that when record number 2 is demanded it is delivered from the head $H_{51}$ to the demanding station 229 by the same path. During the next two records, records numbers 3 and 4 are read by the head $H_{51}$ and recorded upon the track 248 in the positions previously occupied by records numbers 1 and 2 respectively; these are also delivered to the demanding station.

The count does not again change until the thirteenth record cycle; the change occurs since no record was demanded during the previous record cycle. The change in count enables the "read" head $H_{41}$, which delivers the record number 10 from the $D_3$ track 248 to the demanding station 229. For brevity of description, further explanation of the time diagram will not be included herein.

Figure 8:
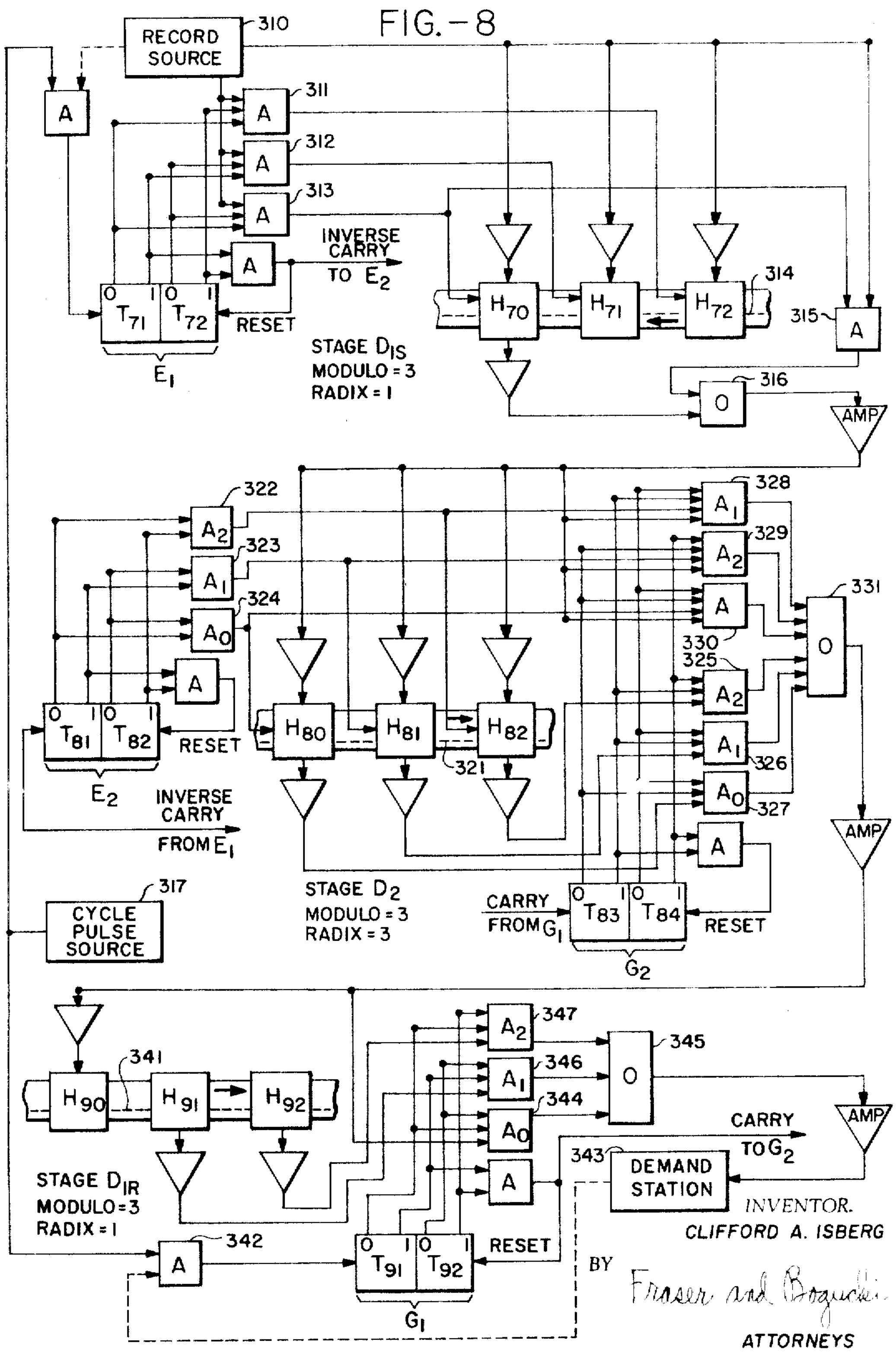
FIG. 8 is a block diagram illustrating one form of a queuing system according to the invention.

In FIG. 8, a three stage queuing memory structure is illustrated. The three stage queuing system consists of one stacking stage, one feeding stage, and a middle stage for performing both stacking and feeding operations. The first stage is the stacking stage having two gated "write" heads $H_{71}$ and $H_{72}$ and a single "write/read" head $H_{70}$. These three heads are arranged at one record cycle intervals around a three record cycle delay loop provided by the circular track 314. The operation of the heads is gated by signals from a one-of-three selector. Two binary stages $T_{71}$ and $T_{72}$ connected for modulo three reverse counting control three input AND gates 311, 312 and 313 to form the selector. As previously explained in connection with the stacking system of FIG. 3, a record received from the source 310 can be recorded upon the magnetic tape track 314 for a one or two cycle delay or be directly bypassed through bypass AND gate 315 to an output OR gate 316 for delivery to the next stage. A cycle pulse source 317 delivers a single pulse per record cycle to the input of an AND gate 318. One of these pulses is passed to the first binary stage of the reverse counter arrangement during each record cycle in which no record is being received from the source 310. In this manner, the first digit $E_1$ of the function is reduced by a single count for each pulse.

The first digit $E_1$ binary counter stages $T_{71}$ and $T_{72}$ are connected for an inverse carry operation with two succeeding binary stages $T_{81}$ and $T_{82}$ of the second stage, which maintain the second digit $E_2$ of the stacking function.

In the second stage three "read/write" magnetic heads $H_{80}$, $H_{81}$ and $H_{82}$ are positioned at equal three record cycle intervals around a continuous recirculating magnetic track 321. Each of the heads $H_{80}$, $H_{81}$ and $H_{82}$ are gated heads responsive to the gating signals from an associated one of three AND gates 322, 323 and 324 of a one-of-three input selector. Each of these heads is normally in the "read" mode and is switched to the "write" mode by the occurrence of the gating signal. The record is read out by one of these heads to the input of the succeeding third stage if an appropriate one of three output AND gates 325, 326 or 327 of a one-of-three output selector is enabled. These output selector AND gates 325, 326, and 327 are under the control of the count contained in the two binary stages $T_{83}$ and $T_{84}$ making up the second digit $G_2$ of the feeding function.

This central queuing stage contains, instead of a single bypass AND gate, three bypass AND gates 328, 329 and 330 which pass an incoming record directly to the output OR gate 331 if, and only if, the stacking function digit $E_2$ is complementary to the feeding function digit $G_2$ for the stage.

After leaving the middle stage a record is recorded by the "write" head $H_{90}$ of the feeding or third stage. Two "read" heads $H_{91}$ and $H_{92}$ and the "write" head $H_{90}$ are positioned at one record cycle intervals around a three record interval continuous loop track 341. Two binary stages $T_{91}$ and $T_{92}$ operate in modulo three count to provide the first binary digit $G_1$ of the feeding function. These two stages $T_{91}$ and $T_{92}$ are interconnected with the other two binary stages $T_{83}$ and $T_{84}$ to form the two stage forward counter for registering the two digit feeding function. The count maintained in these two stages is advanced by the passing of a cycle pulse from the cycle pulse source 317 through the AND gate 342 during the beginning of each cycle after one in which a record was demanded by the demand station 343.

The records arriving from the middle stage can be bypassed through a "zero" AND gate 344 and an output OR gate 345 to the demand station 343 when the feeding function digit $G_1$ is "zero." Two other AND gates 346 and 347 are connected to be enabled by the "one" and "two" counts respectively of the counter digit $G_1$ and together with the bypass or "zero" AND gate 344 form the one-of-three selector at the output of the final stage.

Figure 9:
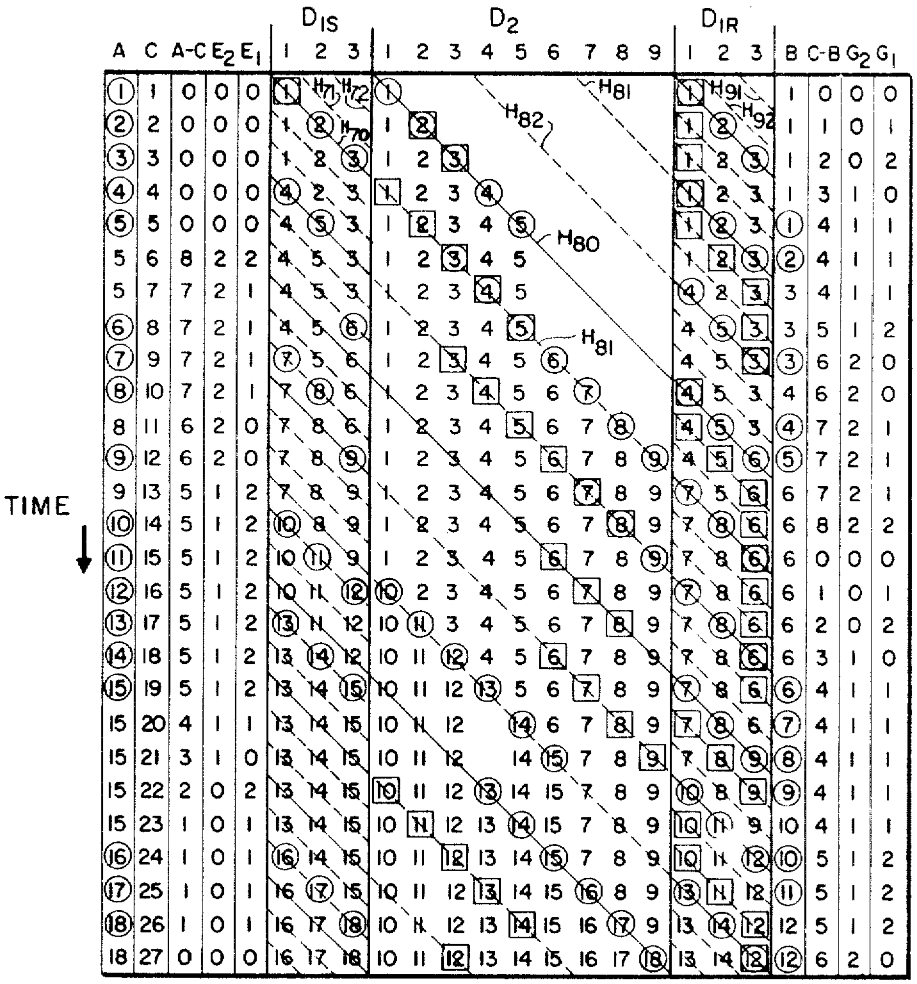
FIG. 9 is a time diagram of data transfers occurring during the operation of a queuing system over successive signal intervals.

FIG. 9 is a time diagram showing successive record cycles of a typical series in the operation of the queuing memory. This time diagram is in many respects similar to the two previously presented time diagrams. On the left hand side of the diagram the stacking functions A, C, $A-C$, $E_2$ and $E_1$ are tabulated for each record cycle. The right hand side of the diagram contains the feeding functions B, $C-B$, $G_2$ and $G_1$. Under the heading $D_{1S}$ the stacking stage record positions are illustrated; under the heading $D_{1R}$, the feeding stage of the queuing system is shown. A circle around a particular number in a record position shows that that numbered record is being recorded in that position. Squares around numbers used in the columns under $D_2$ and $D_{1R}$ are used to illustrate the record position being delivered to the output of that stage. Where the recording circle and the reproducing square coincide in the record positions of the stage $D_2$, it should be noted that the second digits ($E_2$ and $G_2$) of the stacking and feeding functions are complementary; that is, either both are equal to zero, or $E_2$ is equal to two and $G_2$ is equal to one or vice versa. In this complementary situation the record is passed directly from the input of the central stage to the output through one of the bypass AND gates 328, 329 or 330. The circle around numbers in column A denotes the fact that that numbered record is being supplied to the input of the queuing system from the source 310. A corresponding circle in column B indicates a demand for the next record by the demanding station 343 from the queuing system.

During the first three record cycles in the time diagram, the first three records arrive from the source 310 and are recorded in the first three record positions in each of the stages. During the next two record cycles records numbers 4 and 5 arrive and are recorded in the first stage $D_{1S}$ and the second stage $D_2$, but they ae not recorded in the last stage $D_{1R}$ since this stage is already full. The changing $G_1$ count has enabled the different output AND gates in sequence so that record number 1 is always available to the output should a demand be made therefor. During the sixth record cycle, the count remains the same so that record number 2 will be supplied to the output upon demand. The remainder of this time diagram will not be discussed herein, but the operation of the queuing memory structure will become apparent from a study of the other portions in light of the general principles given.

It should be understood that the principles of the queuing memory structure illustrated in this exemplification may be extended to larger queuing memories with greater numbers of stages on the stacking and feeding sides. It is not necessary that the feeding side of the system have the same modulo and radix arrangement as that used on the stacking side of the system. Only in the three stage queing memory is it necessary for obvious reasons.

The stacking, feeding and queuing systems illustrated herein have provided what is termed Class A operation, that is, the output and input rates are exactly equal to the rate of information flow in the different stages between heads. Though they will not be illustrated, other time domain structures may be constructed according to the principles of this invention where the supply and demand rates must be lower than the information flow rate. Such a queuing system would obtain by constructing the center stage of a three stage queuing memory in FIG. 8 to have a nine record cycle delay between adjacent heads. Such a system would give a larger total storage capacity, but the maximum rate at which records could be demanded from the final stage would be reduced to one record every three record cycles.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A variable time delay device for use in manipulating records in the time domain comprising: passive delay means having a total delay interval equal to an integral number of record cycles; a plurality of information access means equally spaced along said passive delay means an integral number of record cycles apart for introducing and removing records from said passive delay means for producing a number of different record delay intervals; counter means for registering a digital count therein corresponding to a desired record delay and for producing gating signals indicative of the digital count registered, said counter means being operable to count with a radix equal to the number of record cycles between adjacent information access means; and gate means responsive to said gating signals for operating said plurality of information access means to provide the desired record delay interval between introduction and removal of a record from said passive delay means.

2. The variable delay device of claim 1 wherein said gate means includes means responsive to a gating signal from said counter means for bypassing said passive delay means.

3. A data processing system for manipulating records in the time domain comprising: a plurality of separate delay means connected in series, each separate delay means including record input and output means for producing different delay intervals equal to a progressively greater integral number of times longer than the longest delay interval of the preceding delay means in the series, and means for bypassing the input and output means without a delay; counter means having separate digital stages, each stage corresponding to a separate delay means and being operable to maintain a digital count having a radix equal to the integral number of the smallest interval provided by the first stage in the series for producing output signals indicative of the count contained therein; and gating means interconnecting the separate stages with the separate delay means for selecting a delay interval equal in record intervals to the digital count within the counter.

4. A routing device for delaying a digital signal between the time of input to the routing device and a selected time of output, the times of input and output being randomly related, comprising: counting means for determining the time difference between the time of input and the time of output, said counting means comprising a series of separate stages connected in counter fashion, each stage registering a separate digit of the total count with the radix of the digit being equal to or less than one more than the total count of all of the preceding stages; a plurality of different signal delay devices, some of said signal delay devices providing a plurality of separate delay intervals equal in record intervals to the count of a respective stage of the counting means; and a plurality of gating means for routing a digital signal to selected signal delay devices, said gating means being coupled to said counting means and being operative responsive to the said time difference whereby the digital signal is selectively routed through said delay devices to coincide with the selected output time.

5. A controllable delay device comprising: a plurality of series connected delay means for providing a series of selectable delay intervals which are an integral number of record cycles in length, each delay means having means for providing a plurality of separate delay intervals with the smallest delay interval of each delay being equal to at least the largest plus the smallest delay interval of the previous delay means; gating means operative in response to control signals for allowing records to pass through selected ones of the plurality of separate delay intervals of a delay means from the previous delay means in the series; and control means for producing the control signals in accordance with a desired delay interval.

6. A stacking system for manipulating records of equal length in the time domain wherein said records are received at the input of the stacking system at random time and are to be recorded from the output at predetermined positions on a circulating memory comprising: a series of separate delay stages for providing a variable delay to a record passing therethrough, each of said delay stages comprising input and output terminals, a recording medium providing fixed delay intervals between selected points spaced therealong, a plurality of read-in means spaced an integral number of record cycles apart along said recording medium, read-out means for removing previously recorded records from the recording medium, each of said read-in means being spaced apart along said recording medium by a delay interval equal to the interval between the read-out means and the adjacent read-in means, gate means connected to said input terminal for gating records to a selected one of said read-in means or to said output terminal, said gating means being responsive to control signals, and means connecting said read-out means to the output terminal of the stage; a multistage digital counter for producing control signals for the gating means, each stage of said digital counter being operable to register a count having a modulo equal to the total number of read-in and read-out means of a respective delay stage of the stacking system and having a radix equal to the number of record cycles of the delay interval between adjacent read-in and read-out means on the recording medium for the respective delay stage; and means for changing the digital count registered by said counter to correspond to the total delay to be produced by the stacking system in placing a record arriving at the input in its predetermined position on the recirculating memory.

7. A variable delay device for providing selectable delays to groups of electrical pulse information comprising: a recording medium; read-out means for deriving information previously recorded on said recording medium; a plurality of read-in means spaced at successively longer intervals along said recording surface from said read-out means, the spacing between adjacent read-in means being equal to the spacing between the first read-in means and the read-out means, said recording medium moving at a constant speed relative to said read-in and read-out means; and means including a counter for providing a digital count having a radix equal to the spacing between adjacent read-in means for selectively choosing one of said read-in means for each group of information recorded to provide different delay intervals between the time that a group of information is recorded on the recording medium and the time it is read out.

8. An electrical system for stacking records in the form of electrical signals comprising: a number of different stacking stages, each stacking stage comprising a recirculating recording medium, a record/reproduce station and a number of record stations located adjacent said recording medium and spaced at equal intervals around the recirculation path of the recording medium, said recording medium moving at a predetermined speed relative to said stations to produce delay intervals between adjacent stations equal to an integral number of record cycles, gating means for actuating one of said stations at a time for recording a record on the medium, and counter control means responsive to external signals for maintaining a count equal to a desired delay between one of said record stations and the record/reproduced station, and additional gate means for delivering a record to a succeeding stage to by-pass the recording medium of the stage.

9. In a data processing system for producing an ordered sequence at the output from records occurring during random record cycles at the input by selective delay of each record at each of a number of delay stages, a delay control device comprising: reverse digital counter means for subtracting a single count from the count contained therein upon the receipt of a pulse, said reverse counter means being divided into separate stages to register separate digits of the total count, each digit being related to a separate delay stage and different selectable delays within that stage, each of said different selectable delays of each stage being a multiple of the smallest selectable delay of that stage; a source of regularly occurring pulses for providing a single pulse during each record cycle; means for producing a negating signal during each record cycle during which a record is received at the input; and means for passing said regularly occurring pulses except during the occurrence of a negating pulse from said negating signal means, the regularly occurring pulses being coupled to the reverse digital counter to reduce by one the total count contained therein for each pulse received.

10. A data processing system for delivering records from a source in a predetermined sequence when the source is supplying the records during random record cycles comprising: a plurality of separate recirculating delay memories arranged in series between said source in said output station, said recirculating delay memories including a plurality of input means and a single output means arranged at equal delay intervals from one another; gate means interconnecting said recirculating delay memories for transferring records between said plurality of memories to receive a selected delay by delivering the records to selected ones of said input means of a stage and removing the records of said output means; and logic means coupled to control said gate means and being responsive both to the supply of records from the source and the predetermined sequence for providing an orderly flow of the records to said output station.

11. An electrical system for feeding records from an ordered source to a demanding station upon demand comprising: a series of separate delay stages connected in series, each stage comprising a recirculating memory loop having a single recording station thereon and a number of reproducing stations, said recording station and said reproducing stations being at equally spaced delay intervals an integral number of record cycles long on said recirculating memory loop, and selector means for gating a record, either directly from the input to the output of a stage or through one of said record stations to said loop; and multistage counter means for maintaining a digital count equal to the appropriate delay desired, each counter stage providing a multidigit count with a radix equal to the number of record cycles in the equally spaced delay intervals of a respective delay stage and being connected to control said selector means in accordance with the count therein.

12. A data processing system for delivering records from a source in a predetermined sequence to an output station making random demands for such records comprising: a plurality of separate recirculating delay memories arranged in series between said source and said output station; an input means and a plurality of output means spaced at equal delay intervals about some of said recirculating delay memories; gate means connecting said recirculating delay memories for transferring records between said plurality of memories to receive a delay in selected ones by delivering the records to said input means and removing the records from the memories through a selected one of said output means; and logic means coupled to control said gate means and being responsive to the number of records contained in said plurality of memories and the demands from said output station for providing an orderly flow of the records to said output station whenever a demand is made.

13. A binary data information processing system for manipulating records of equal length between an input terminal receiving the records in an ordered sequence and an output station demanding the records at random time intervals comprising: a plurality of passive recirculating delay devices connected in series relation between the input terminal and the output station, each of said plurality of delay devices having a plurality of selectable delay intervals, each successive interval in each delay device being one more integral number of times longer than the shortest delay interval; a plurality of gating circuits, each of said gating circuits being connected to the output of a respective one of said recirculating delay devices, said gating circuits having means for selectively routing a record to either bypass a respective delay device or to be delayed one of said plurality of selectable delay intervals; and logical circuit means for individually controlling each of said gating circuits, said logical circuit means producing output signals to each of said gating means individually in accordance with the number and position of the individual records within said plurality of delay devices.

14. A data processing system for transferring records from a source in the serial order of their occurrence to an output station making random demands from such records comprising: a plurality of delay stages connected in series between the source and the output stations; each of said stages including an input device, a number of output devices, a passive recirculating delay device having the input and output devices arranged at equal delay intervals from one another thereon, a bypass connection in parallel between said input and output devices for passing records without delay from an input terminal to the output terminal of the stage, and gating means responsive to control signals for selectively obtaining records from the delay stages by selecting one of said output devices; and logic means responsive to demands from said output station to maintain a prescribed order of the records within the different delay devices whereby the random demands from the output station will be satisfied by records in their predetermined serial order.

15. A circuit for providing records upon demand in the order of that receipt at the input of the circuit comprising: recirculating memory means providing a number of independent record recirculating paths each having a period of recirculation an integral number of record cycles long and an integral number of times longer than the period of recirculation of the preceding recirculating memory means; means for selectively transferring a record between said paths in accordance with the order of their receipt, said means including an input means and a plurality of output means for the paths and being responsive to control signals for selectively choosing one of said output means; and memory means coupled to said means for transferring for counting the order of receipt and producing said control signals.

16. A recirculating memory system to provide records in a predetermined order to an output station making random demands for such records comprising: a series connection of passive recirculating delay devices, each having a different recirculation period, the recirculating delay devices having the smallest recirculating periods being connected to the output station with the others being connected in the series in the ascending order of their recirculation period; gate means associated with each recirculating delay device for transferring selected records from one recirculating delay device to another having a larger recirculation period and for operating in response to a control signal, said gate means including a number of output devices for removing records at a number of equally separated intervals along the recirculating delay device; and means for determining a desired order of the records within each recirculating delay device in accordance with the prescribed order and the demands made by the output station and for generating control signals based upon such determination, the control signals being coupled to the selectively operate gate means.

17. A data processing system for transferring records received at random times from a source to a demanding station demanding the records at random times comprising: a first plurality of delay devices arranged in a series order of ascending total delay intervals connected to the source, said first plurality each including a single output means and a number of equally spaced input means to produce selectable different delays; a second plurality of delay devices connetced in series order of descending total delay intervals, each of said second plurality including a single input means and a number of output means for removing records from the delay device at selectable different intervals; a connecting delay device connected in series between said first and said second plurality of delay devices having a plurality of input/output means spaced at equal intervals on said delay device for selectively introducing records from said first plurality or removing records for transfer to said second plurality; the input and output means and input/output means all being responsive to control signals; and logic control means responsive to the order of records contained in both said first and second plurality and said connecting delay device for producing the control signals.

18. A data processing system for transferring records received at random times from a source to a demanding station demanding the records at random times comprising: a first plurality of recirculating memories arranged in series order of ascending total delay intervals connected to the source, each of said first plurality having a plurality of input means, an output means, and gating means responsive to control signals for selectively choosing one of said output means, said output means and input means being spaced at equal intervals about the recirculating delay device with each interval equal to the total recirculation interval of the preceding recirculation delay device; the second plurality of delay devices connected in series order of descending total delay intervals, each of said second plurality including an input means and a number of output means, gating means responsive to control signals for selectively choosing one of said output means, said output and input means being spaced at equal intervals about said recirculating delay device with the interval being equal to the total recirculation interval of the succeeding one of said second plurality; and a central recirculating delay device connected in series between said first and second plurality, said recirculating delay device having a number of input/output means disposed at equal intervals around said recirculating delay device, each interval being equal to the total recirculating period of the adjacent delay devices of said first and said second plurality of devices, a first control means responsive to arrange the records in a predetermined order in said central delay device, and second control means responsive both to the number of records in the delay devices of said second plurality and to the demands for said records from the demanding station to maintain a prescribed order of the records in said second plurality of devices, said first and second control means producing first and second control signals for selectively controlling all of said recirculating delay devices.

19. The data processing system of claim 18 in which: said first control means consists of a multidigit reverse counter with the individual digits being connected in series order and are representative of the selectable delays of an associated one of said first plurality of recirculating delay devices; and said second control means consists of a multidigit forward counter with the digits connected in series order, each digit representing the selectable delays of an associated one of said second plurality of recirculating delay devices, the count of said first control means being decreased during each record cycle interval in which no record is received at the source, and the count in said second control means being increased after each record cycle interval in which no record is demanded by the demanding station.

References Cited by the Examiner

UNITED STATES PATENTS 2,674,732 4/1954 Robbins ------------ 340—347

ROBERT C. BAILEY, *Primary Examiner.*

R. B. ZACHE, *Assistant Examiner.*

UNITED STATES PATENT OFFICE
CERTIFICATE OF CORRECTION

Patent No. 3,299,406 January 17, 1967

Clifford A. Isberg

It is hereby certified that error appears in the above numbered patent requiring correction and that the said Letters Patent should read as corrected below.

Column 1, line 35, for "is", first occurrence, read -- it --; line 59, for "of" read -- for --; column 2, line 40, for "received" read -- receiving --; column 3, line 73, for "acording" read -- according --; column 5, line 41, for "intreval" read -- interval --; line 67, for "container" read -- counter --; column 8, line 34, before "amplified" insert -- then --; same line 34, for "the amplifier" read -- an amplifier --; column 8, line 57, before "binary" insert -- single --; column 9, line 65, before "also" insert -- is --; column 12, line 18, strike out ", pass the records reproduced by" and insert instead -- . Three other AND gates 243, --; line 24, after "248" insert a comma; column 14, line 72, for "ae" read -- are --; column 15, lines 14 and 15, for "queing" read -- queuing --; line 72, after "smallest" insert -- delay --; column 17, line 26, for "reproduced" read -- reproduce --; column 19, line 29, for "to the selectively operate" read -- to selectively operate the --; line 39, for "connetced" read -- connected --; column 20, line 23, for "recirculating" read -- recirculation --.

Signed and sealed this 21st day of November 1967.

(SEAL)
Attest:

EDWARD M.FLETCHER,JR.
Attesting Officer

EDWARD J. BRENNER
Commissioner of Patents